(12) United States Patent
Yu et al.

(10) Patent No.: US 9,806,360 B2
(45) Date of Patent: Oct. 31, 2017

(54) UNIT CELL FOR SOLID-OXIDE FUEL CELL AND SOLID-OXIDE FUEL CELL USING SAME

(71) Applicant: KOREA INSTITUTE OF ENERGY RESEARCH, Daejeon (KR)

(72) Inventors: Ji-Haeng Yu, Daejeon (KR); In-Sub Han, Daejeon (KR); Doo-Won Seo, Daejeon (KR); Se-Young Kim, Gyeonngi-do (KR); Sang-Kuk Woo, Daejeon (KR); Sun-Dong Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 576 days.

(21) Appl. No.: 14/380,107

(22) PCT Filed: Feb. 12, 2013

(86) PCT No.: PCT/KR2013/001087
§ 371 (c)(1),
(2) Date: Aug. 21, 2014

(87) PCT Pub. No.: WO2013/129787
PCT Pub. Date: Sep. 6, 2013

(65) Prior Publication Data
US 2015/0024299 A1      Jan. 22, 2015

(30) Foreign Application Priority Data

Feb. 27, 2012 (KR) .......................... 10-2012-0019749

(51) Int. Cl.
*H01M 2/14* (2006.01)
*H01M 8/04082* (2016.01)
(Continued)

(52) U.S. Cl.
CPC ..... *H01M 8/04201* (2013.01); *H01M 8/0273* (2013.01); *H01M 8/0297* (2013.01);
(Continued)

(58) Field of Classification Search
None
See application file for complete search history.

(56) References Cited

U.S. PATENT DOCUMENTS

2009/0246598 A1* 10/2009 Suzuki ................ F04F 5/54
429/425
2012/0301815 A1* 11/2012 Yoshimine .......... H01M 8/0247
429/508
(Continued)

FOREIGN PATENT DOCUMENTS

JP       6-076842 A    3/1994
JP       07-105961 A   4/1995
(Continued)

*Primary Examiner* — Jayne Mershon
(74) *Attorney, Agent, or Firm* — Enshan Hong; VLP Law Group LLP

(57) ABSTRACT

The present invention relates to a unit cell for a solid-oxide fuel cell and to a solid-oxide fuel cell using same, and, more specifically, relates to: a unit cell for a solid-oxide fuel cell, wherein a fuel charging-and-discharging part and an air charging-and-discharging part are provided perpendicularly to a cathode comprised in the solid-oxide fuel cell; and a solid-oxide fuel cell using same.

5 Claims, 7 Drawing Sheets

(51) Int. Cl.
  *H01M 8/1213*  (2016.01)
  *H01M 8/2425*  (2016.01)
  *H01M 8/0273*  (2016.01)
  *H01M 8/0297*  (2016.01)
  *H01M 8/1246*  (2016.01)
  H01M 2/16     (2006.01)
  H01M 8/14     (2006.01)
  H01M 8/124    (2016.01)
  H01M 8/0202   (2016.01)

(52) U.S. Cl.
  CPC ....... *H01M 8/1213* (2013.01); *H01M 8/1246* (2013.01); *H01M 8/2425* (2013.01); H01M 2/1673 (2013.01); H01M 8/0202 (2013.01); H01M 8/124 (2013.01); H01M 8/142 (2013.01); H01M 2008/1293 (2013.01); H01M 2300/0071 (2013.01); Y02P 70/56 (2015.11)

(56) References Cited

U.S. PATENT DOCUMENTS

2013/0280633 A1* 10/2013 Kim .................... H01M 8/1213
                                                      429/457
2014/0147771 A1*  5/2014 Lund-Olesen .... H01M 8/04186
                                                      429/482

FOREIGN PATENT DOCUMENTS

| JP | 2003-331874 A   | 11/2003 |
| KR | 10-0538555 B1   | 3/2005  |
| KR | 10-0942091 B1   | 5/2009  |
| KR | 10-2010-0072802 A | 7/2010 |

* cited by examiner

UNIT CELL FOR SOLID-OXIDE FUEL CELL AND SOLID-OXIDE FUEL CELL USING SAME

TECHNICAL FIELD

The present invention relates generally to a unit cell for a solid-oxide fuel cell and a solid-oxide fuel cell composed of the same.

BACKGROUND ART

A solid-oxide fuel cell (SOFC) typically includes a unit cell as a basic structural element which comprises an electrolyte layer such as yttria-stabilized zirconia and an anode (fuel electrode) and a cathode (air electrode) attached to both sides of the electrolyte layer. It is typical that the electrolyte layer such as yttria-stabilized zirconia has a dense structure so as not to allow fuel to be mixed with air whereas an anode and a cathode has a porous structure so as to allow fuel and hydrogen to be efficiently diffused.

The solid-oxide fuel cell has been developed into a planar fuel cell and a tubular fuel cell. Furthermore, the tubular fuel cell may be classified into a cylindrical fuel cell and a flat-tubular fuel cell which is flattened to allow the fuel cells to be easily stacked. A method which is usually used in the production of the planar fuel cell and the tubular fuel cell is embodied by reducing resistance of a fuel cell by applying a thin electrolyte film on an electrode support in order to improve an output density of a unit cell for solid-oxide fuel cell.

In the planar solid-oxide fuel cell, although the layering of cells and the collection of current are facilitated because a metal connecting plate is used, there are disadvantages in that it is difficult to manufacture a large-area planar cell and an additional seal material is required to separate flows of fuel and air at upper and lower parts of the cell.

For the planar solid-oxide fuel cell, a metal connector, which is currently used as a connecting plate functioning to isolate fuel from air and to connect fuel cells in a series circuit manner, has shown the general problems of corrosion at a high temperature and deterioration of performance of the fuel cell owing to reaction of a cathode of a solid-oxide fuel cell and Cr volatilized from a stainless alloy. The problems of the connector have a critical effect on the durability of a solid-oxide fuel cell stack.

A conventional solid-oxide fuel cell is configured to separate flows of fuel and air using a metal connector and a cell frame and supply the separated fuel and air to a front part and a rear part of the cell. The conventional solid-oxide fuel cell has problems such as difficulty in forming a seal between the cell and the metal plate, an increase in the weight of the stack and the load to the cell, an increase in volume of the stack and increases in manufacturing costs of the stack due to metal working costs.

Conventional technologies relating to the field of the present invention may include Korean Pat. Nos. 10-0538555 and 2008-0131314.

DISCLOSURE

Technical Problem

An object of the present invention is to provide a unit cell for a solid-oxide fuel cell which is composed of a plurality of layered unit cells and which does not need an additional separation plate and includes an anode provided with both an air flow hole and a fuel flow hole.

Another object of the present invention is to provide a unit cell for a solid-oxide fuel cell and a solid-oxide fuel cell composed of the unit cells, which can achieve reductions in manufacturing costs and size thereof.

Technical Solution

In order to accomplish the above object, the present invention provides a unit cell for solid-oxide fuel cell which includes an anode, an electrolyte layer, a cathode and a connector layer, the unit cell comprising: the anode including fuel flow holes formed in marginal regions of both sides thereof from an upper surface to a lower surface thereof; a plurality of fuel flow paths formed in the anode and extending between the fuel flow holes and air flow holes formed in marginal regions of the other both sides of the anode and positioned adjacent to the fuel flow paths; the cathode layered on the electrolyte layer applied on the anode; and the connector layer applied on the lower surface of the anode.

Furthermore, the present invention provides a solid-oxide fuel cell which is manufactured by sequentially layering the unit cells for a solid-oxide fuel cell, wherein a plurality of unit cells are layered such that a cathode of one of the unit cells is coupled to a connector layer of another unit cell, air flow holes of the plurality of unit cells are connected to each other to form an air flow passage, and fuel flow holes of a plurality of unit cells are connected to each other to form a fuel flow passage.

Advantageous Effects

According to the present invention, since the fuel flow holes and the air flow holes are vertically formed in the anode, there is no need for additional separating plates and additional sealing work for injection and discharge of fuel and air through a lateral surface of the fuel cell, and thus a reduction in weight, size, manufacturing costs and the like of the unit cell for a solid-oxide fuel cell is achieved.

BEST MODE

Figure 1:
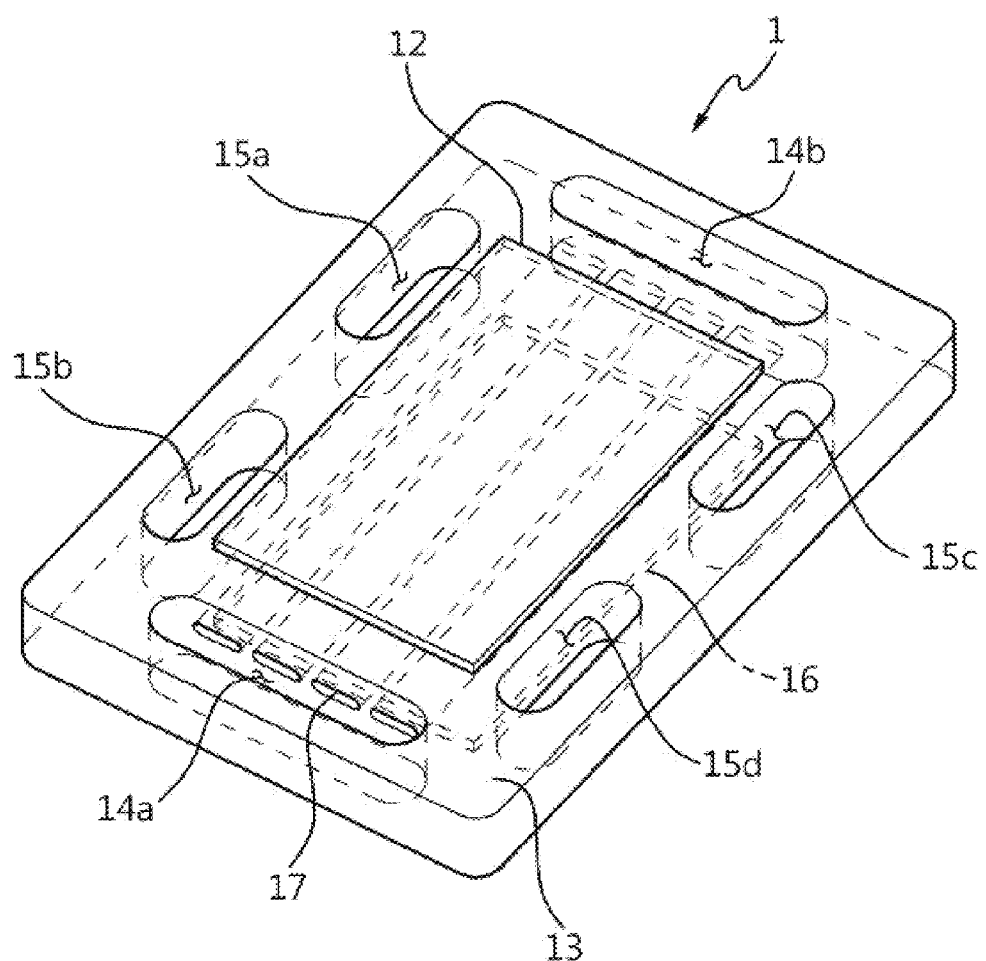
FIG. 1 is a perspective view of a unit cell for solid-oxide fuel cell according to the present invention.
Figure 2:
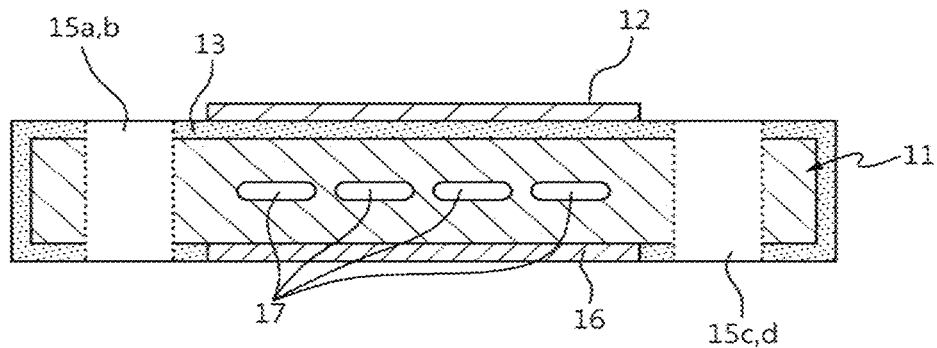
FIG. 2 is a cross-sectional view of the unit cell for solid-oxide fuel cell according to the present invention.
Figure 3:
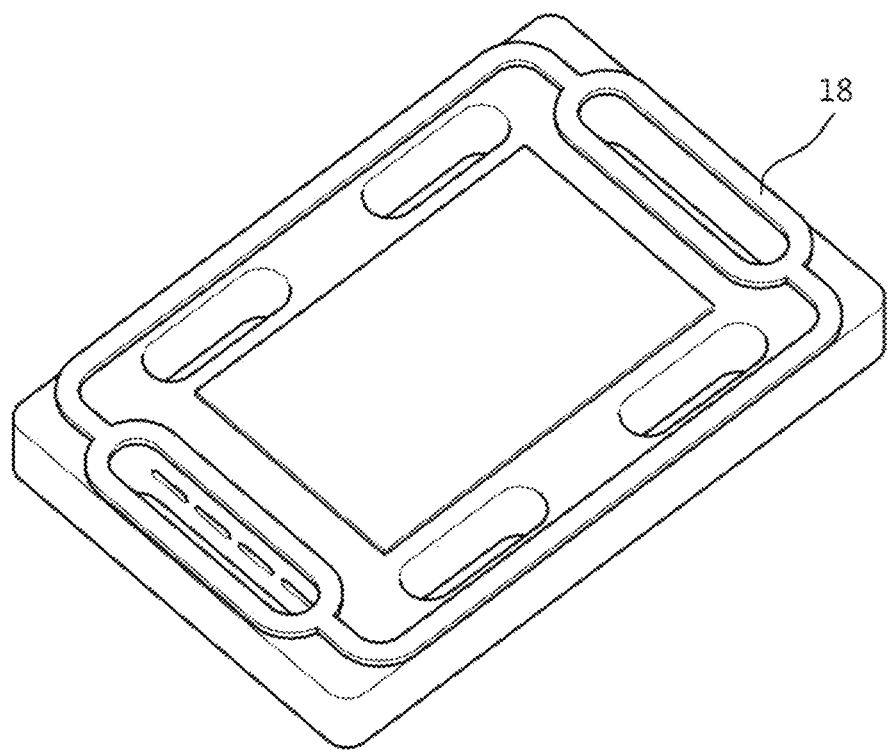
FIG. 3 is a perspective view of the unit cell for a solid-oxide fuel cell according to the present invention which includes a sealing gasket.

The present invention will be described in detail below.

The present invention provides a unit cell for a solid-oxide fuel cell which includes an anode, an electrolyte layer, a cathode and a connector layer, the unit cell comprising: the anode including fuel flow holes formed in marginal regions of both sides thereof from an upper surface to a lower surface thereof; a plurality of fuel flow paths formed in the anode and extending between the fuel flow holes and air flow holes formed in marginal regions of the other both sides of the anode and positioned adjacent to the fuel flow paths; the cathode layered on the electrolyte layer applied on the anode; and the connector layer applied on the lower surface of the anode.

In the solid-oxide fuel cell, when air and fuel are supplied to respective electrodes of a unit cell, which are composed of an electrolyte layer and a cathode and an anode disposed on both sides of the electrolyte layer, the reduction of oxygen occurs at the cathode thus creating oxygen ions. The oxygen ions move to the anode through the electrolyte layer and then further react with fuel (hydrogen) supplied to the anode thus creating water. At this point, since ions are created at the anode and ions are consumed at the cathode, connection between the anode and the cathode enables electricity to flow therebetween.

In a conventional planar solid-oxide fuel cell, fuel and air are injected through lateral surfaces of a cell stack, respectively, to create electricity. Meanwhile, in the unit cell for a solid-oxide fuel cell according to the present invention, since the air flow holes and the fuel flow holes are vertically formed in the unit cell, the solid-oxide fuel cell, which is composed of the unit cells, is configured to allow air and fuel to be injected through the lowermost unit cell of the cell stack to thus electricity rather than through lateral surfaces of the cell stack. Consequently, the unit cell for a solid-oxide fuel cell according to the present invention does not need sealing or a housing which are required to enable air or fuel to evenly flow through lateral surfaces of the conventional solid-oxide fuel cell, and a manifold may be provided to the lowermost unit cell to control air flow.

The cathode is preferably applied on the electrolyte layer applied on an electrolyte layer formed on the anode such that the anode is positioned between the air flow holes. Air is introduced into an air flow hole formed in a marginal region of one side of the unit cell to supply oxygen to the cathode, and the remaining air from which the oxygen has been consumed is discharged through an air flow hole formed in a marginal region of the opposite side of the unit cell.

It is preferable to further provide a sealing gasket for isolating the fuel flow hole from the air flow hole. The sealing gasket functions to isolate the fuel flow hole vertically formed from the air flow hole vertically formed so as to prevent fuel from being mixed with air, thus improving power generation efficiency of the fuel cell.

The connector layer is preferably made of ceramic. In a cell stack, which is composed of a plurality of unit cells layered one on another, the connector layer functions to connect one unit cell to another unit cell to allow current to flow therebetween. Accordingly, a unit cell including a connector layer layered on one side of an anode is coupled to a cathode of another unit cell through the connector layer to form a cell stack. While a metal connector layer has disadvantages such as corrosion at a high temperature, higher manufacturing costs, and increased weight, a ceramic connector layer assures no corrosion at high temperature conditions, and reduces both manufacturing costs and weight, thus enabling weight saving of a fuel cell.

A surface of the connector layer or the cathode is preferably provided with a plurality of protrusions. When a plurality of unit cells for solid-oxide fuel cell are layered to form a cell stack and then air is introduced into the cell stack, the protrusions provided on a surface of the cathode or a surface of the connector layer formed on the cathode enables oxygen to be efficiently supplied to the cathode thus improving a power generating efficiency.

The present invention provides a solid-oxide fuel cell which is manufactured by sequentially layering the unit cells for the solid-oxide fuel cell, wherein a plurality of unit cells are layered such that a cathode of one of the unit cells is coupled to a connector layer of another unit cell, air flow holes of the plurality of unit cells are connected to each other to form an air flow passage, and fuel flow holes of a plurality of unit cells are connected to each other to form a fuel flow passage. Furthermore, it is preferable that the plurality of unit cells are layered such that air and fuel are injected into and discharged from the air flow holes and the fuel flow holes of a lowermost unit cell of the plurality of layered unit cells.

The solid-oxide fuel cell can circulate fuel and air through the air flow hole and the fuel flow hole formed in the lowermost unit cell of the solid-oxide fuel cell thus generating power. Unlike a conventional fuel cell, which includes an air flow hole and a fuel flow hole formed in lateral surfaces, the present invention does not need sealing at lateral surfaces which enables simplification of manufacture, easy sealing and reduction of manufacturing costs. Furthermore, since the present invention utilizes a ceramic connector layer as the connector layers without the use of an additional metal connector layer and a cell frame, it is possible to provide a fuel cell having a reduced weight and a smaller size.

It is preferable that a metal mesh or a ceramic felt is interposed between an anode of a unit cell and a connector layer of another unit cell. At this point, it is preferable that the metal mesh includes at least one selected from the group consisting of gold, silver, platinum and stainless steel. The metal mesh can reduce a contact resistance between layered unit cells thus improving performance of the fuel cell and can prevent the breakage of the unit cells caused by a load applied to the unit cells.

The unit cell for a solid-oxide fuel cell according to the present invention may be manufactured by a process of using an extruder or a process of layering anode tapes prepared by tape casting but should not be construed as being limited thereto.

More specifically, in order to manufacture a unit cell for a solid-oxide fuel cell, the process of using an extruder includes the steps of: 1) molding an anode using a ceramic extruder such that a fuel flow hole is formed therein, providing sealing at the opposite ends of the anode, drying the anode and forming a fuel flow hole and an air flow hole in the anode in a vertical manner; 2) coating one side of the anode with a connector layer and coating the other side of the anode with an electrolyte layer; 3) heat-treating the anode; and 4) coating the anode with a cathode with the electrolyte layer disposed therebetween and then heat-treating the resulting anode.

Meanwhile, in order to manufacture a unit cell for a solid-oxide fuel cell, the process of layering anode tapes includes the steps of 1) subjecting an anode tape prepared by tape casting to laser cutting, ultrasound ablation or machining; 2) layering anode tapes each including only an air flow holes to both sides of the anode tape including only a fuel flow hole formed therein and laminating the layered body while heating the layered body; 3) forming a fuel flow passage in the layered body; 4) coating one side of the resulting anode with a connector layer and coating the other side of the resulting anode with an electrolyte layer; 5) heat-treating the anode; and 5) coating the anode with a cathode with the electrolyte layer disposed therebetween and heat-treating the resulting anode.

Mode for Invention

Hereinafter, embodiments of the present invention will be described in detail.

The following embodiment is for purpose of illustration only and is not intended as a definition of the limits of the invention.

Reference numerals disclosed in this specification will be described as follows. 1 denotes a unit cell for a solid-oxide fuel cell, 11 denotes an anode, 12 denotes a cathode, 14a and 14b denote fuel flow holes, 15a, 15b, 15c, 15d denote air flow holes, 16 denotes a connector, 17 denotes a fuel flow path, 18 denotes a sealing gasket, 19 denotes a metal mesh, 20 denotes a manifold, 21 denotes a top plate and 22 denotes a bottom plate.

EXAMPLE 1

Manufacture of a Unit Cell for Solid-oxide Fuel Cell

A flat anode support 11, that is, an anode 11 is molded using a ceramic extruder such that fuel flow paths 17 are formed therein, and the opposite ends of the anode 11 are sealed. Subsequently, the molded body is vertically formed with fuel inlet and outlet 14a, 14b and air inlets and outlets 15a, 15b, 15c, 15d. The bottom surface of the anode 11 is coated with a connector layer 16. The area of a surface of the anode 11, which is not coated with the connector layer 16 is coated with an electrolyte layer 13, and the anode 11 is heat-treated at a temperature of 1350 to 1400° C. so that the connector layers 16 and the electrolyte layer 13 form a dense structure. The surface of the electrolyte layer 13 which faces away from the connector layer 16 is coated with a cathode 12 and is heat-treated at a temperature of 900 to 1200° C. thus preparing a unit cell for the solid-oxide fuel cell 1.

At this point, the air flow holes 15a, 15b, 15c, 15d are vertically formed in marginal regions of both longitudinal sides of the anode 11 with the cathode 12 disposed therebetween. The fuel flow holes 14a, 14b are vertically formed in marginal regions of both other sides of the anode 11 and communicate with the fuel flow paths 17 to allow fuel to flow therethrough.

EXAMPLE 2

Manufacture of an Unit Cell for a Solid-oxide Fuel Cell

Figure 4:
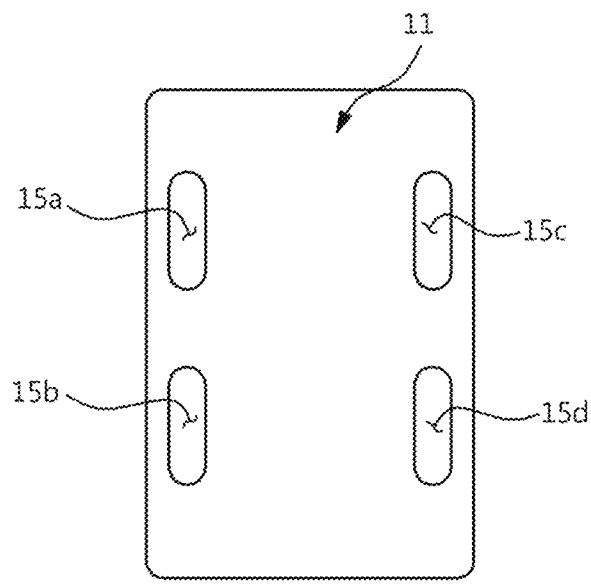
FIG. 4 shows one anode tape which is used in manufacture of the unit cell for a solid-oxide fuel cell according to the present invention.
Figure 5:
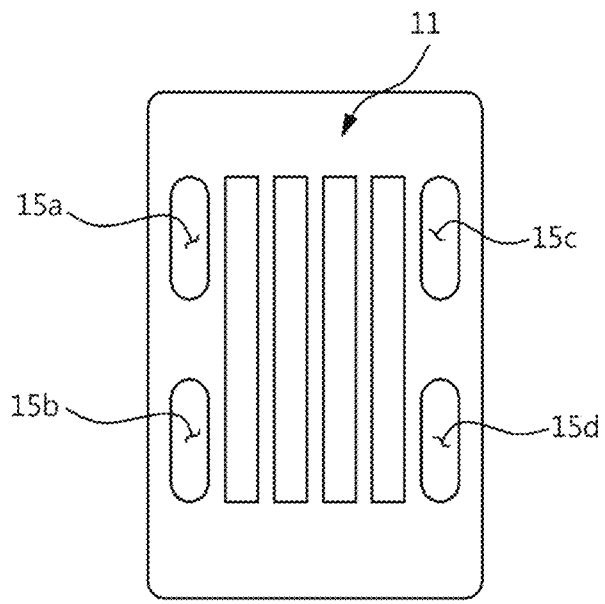
FIG. 5 shows another anode tape which is used in manufacture of the unit cell for a solid-oxide fuel cell according to the present invention.

Anode tapes, which are prepared through tape casting, are worked using a laser cutting process as illustrated in FIGS. 4 and 5. The anode tape illustrated in FIG. 4 is used as first and third layers and the anode tape illustrated in FIG. 5 is used as a second layer. The first to third layers are sequentially layered. Subsequently, the layers are laminated while being heated, and the plurality of fuel flow paths 17 are connected. The fuel flow holes 14a, 14b are vertically formed in the anode.

Thereafter, the anode including the fuel flow paths 17 therein is pre-sintered (heat-treated). The bottom surface of the anode 11 is coated with the connector layer 16, and the remaining surface of the anode 11 that is not coated with the connector layer 16 is coated with the electrolyte layer 13. The anode is heat-treated at a temperature of 1350 to 1400° C. to densify the connector layer 16 and the electrolyte layer 13. Subsequently, the surface of the electrolyte layer 13 that faces away from the connector layer 16 is coated with a cathode 12 and is heat-treated at a temperature of 900 to 1200° C. thus preparing a unit cell for solid-oxide fuel cell 1 as illustrated in FIG. 1.

EXAMPLE 3

Manufacture of an Unit Cell for a Solid-oxide Fuel Cell

The prepared unit cell for a solid-oxide fuel cell 1 is provided with a sealing gasket 18 so as to isolate the fuel flow holes 14a, 14b from the air flow holes 15a, 15b, 15c, 15d, thus providing the unit cell for a solid-oxide fuel cell including the seaming gasket.

EXAMPLE 4

Manufacture of a Solid-oxide Fuel Cell

Figure 6:
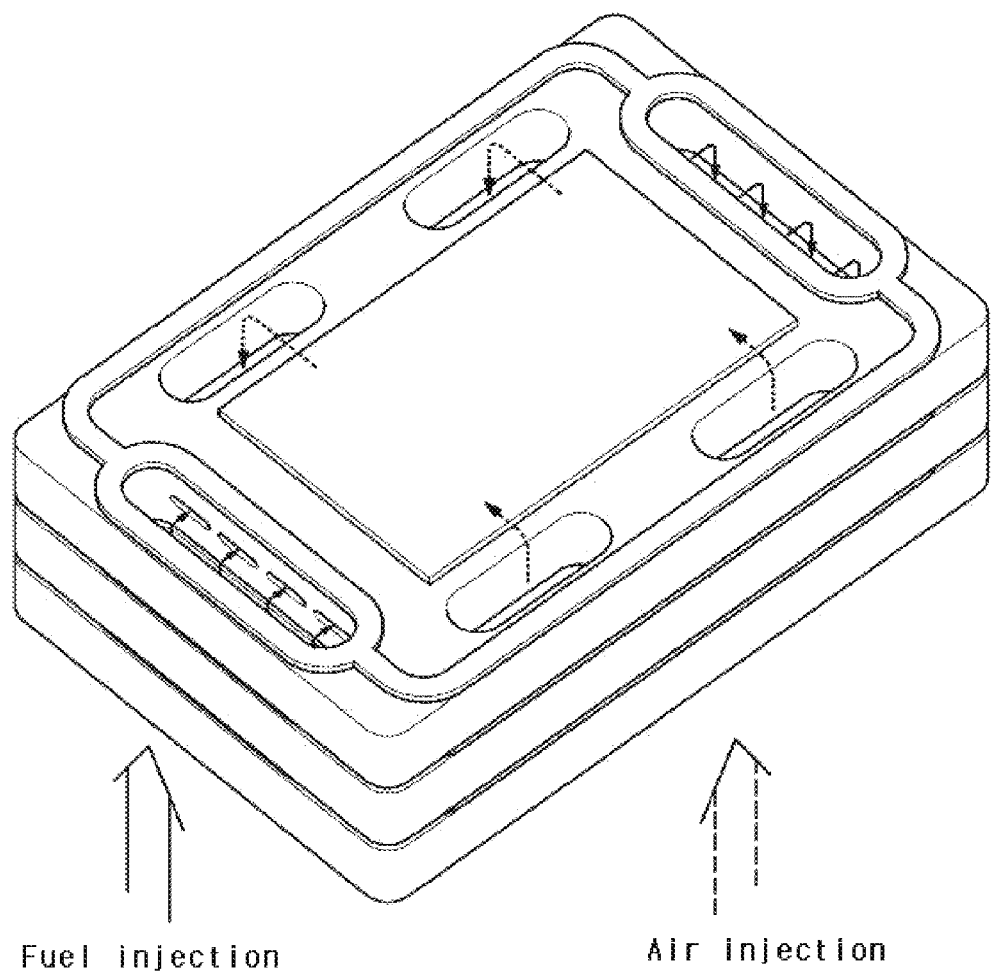
FIG. 6 is a perspective view showing flows of fuel and air in a fuel cell stack which is manufactured by layering the unit cells for a solid-oxide fuel cell according to the present invention.
Figure 7:
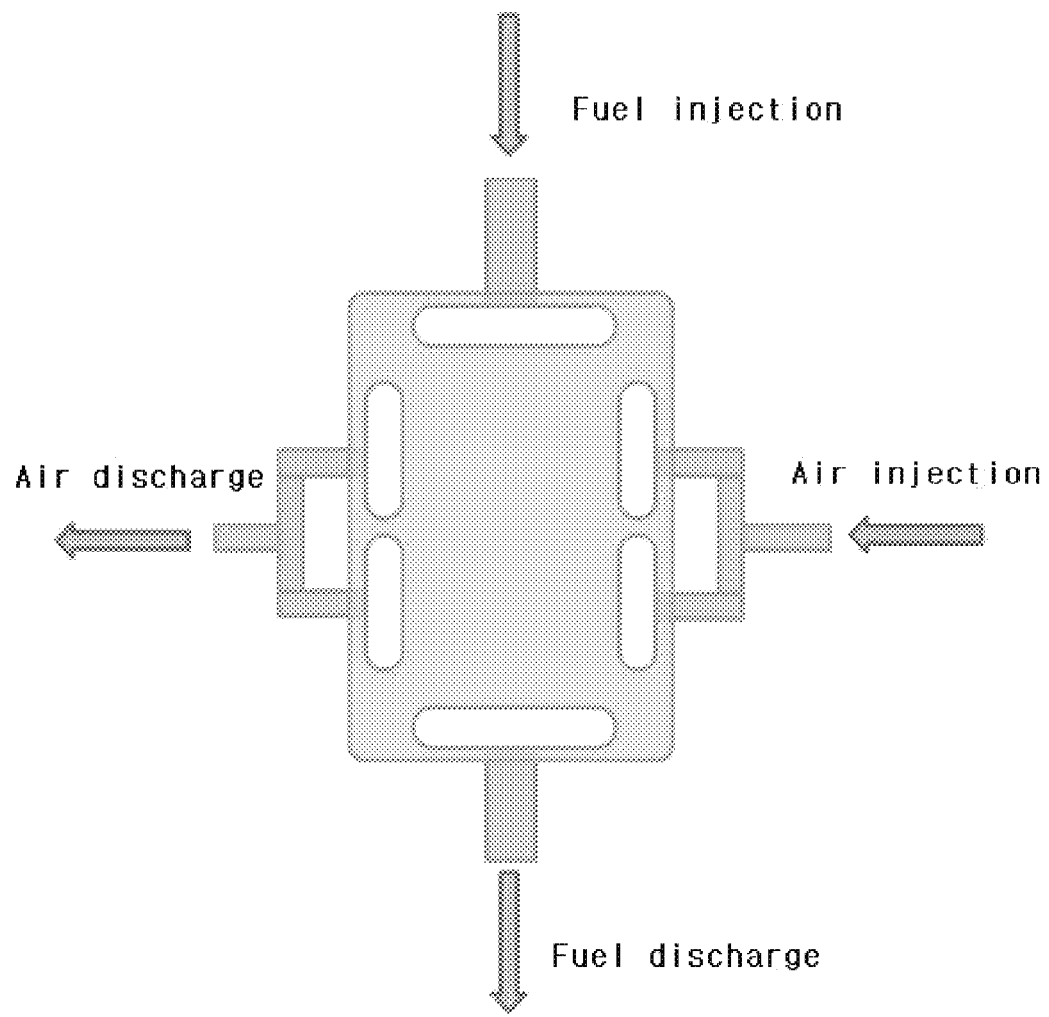
FIG. 7 is a plan view showing flows of fuel and air in the unit cell for a solid-oxide fuel cell according to the present invention.

FIG. 6 is a perspective view of a solid-oxide fuel cell stack which is manufactured by stacking the unit cells for a solid-oxide fuel cell prepared in Example 3. As illustrated in FIG. 6, a plurality of unit cells for a solid-oxide fuel cell is layered to provide the solid-oxide fuel cell stack. Fuel and air are injected into a lower surface of a unit cell layered at the lowermost position to create electricity. The injected fuel and air are discharged from the air flow holes and the fuel flow holes positioned at the opposite upper surface. FIG. 7 schematically shows the flows of air and fuel.

Figure 8:
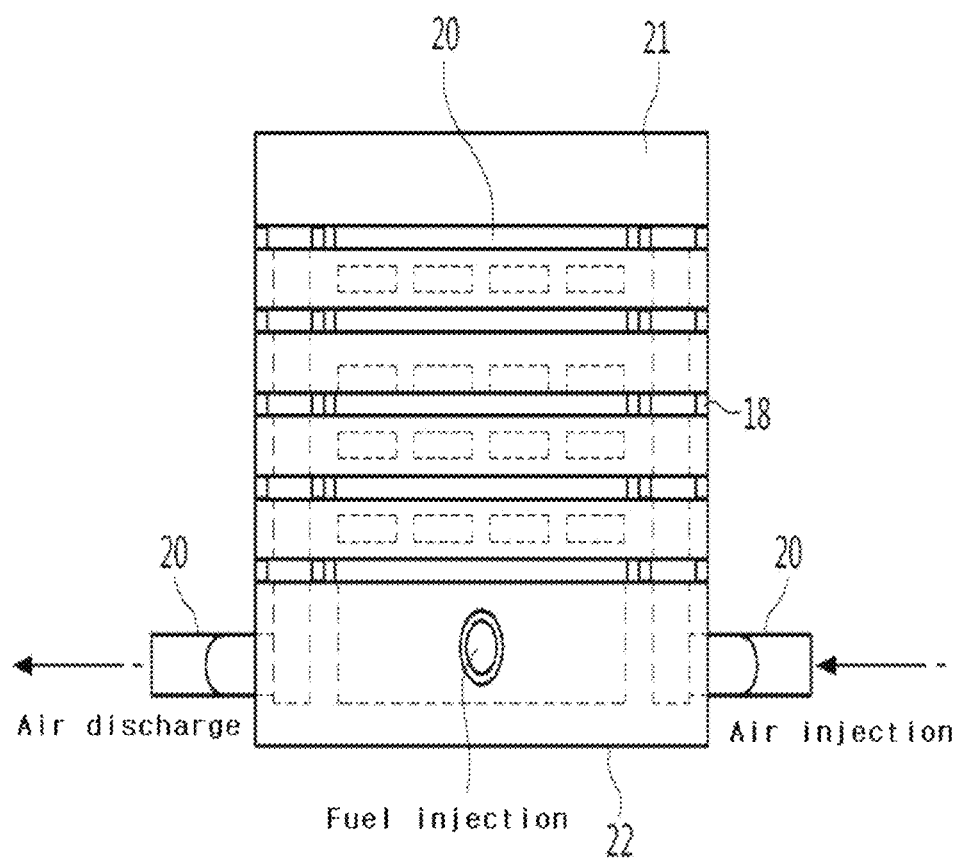
FIG. 8 is a cross-sectional view of a solid-oxide fuel cell according to the present invention.
Figure 9:
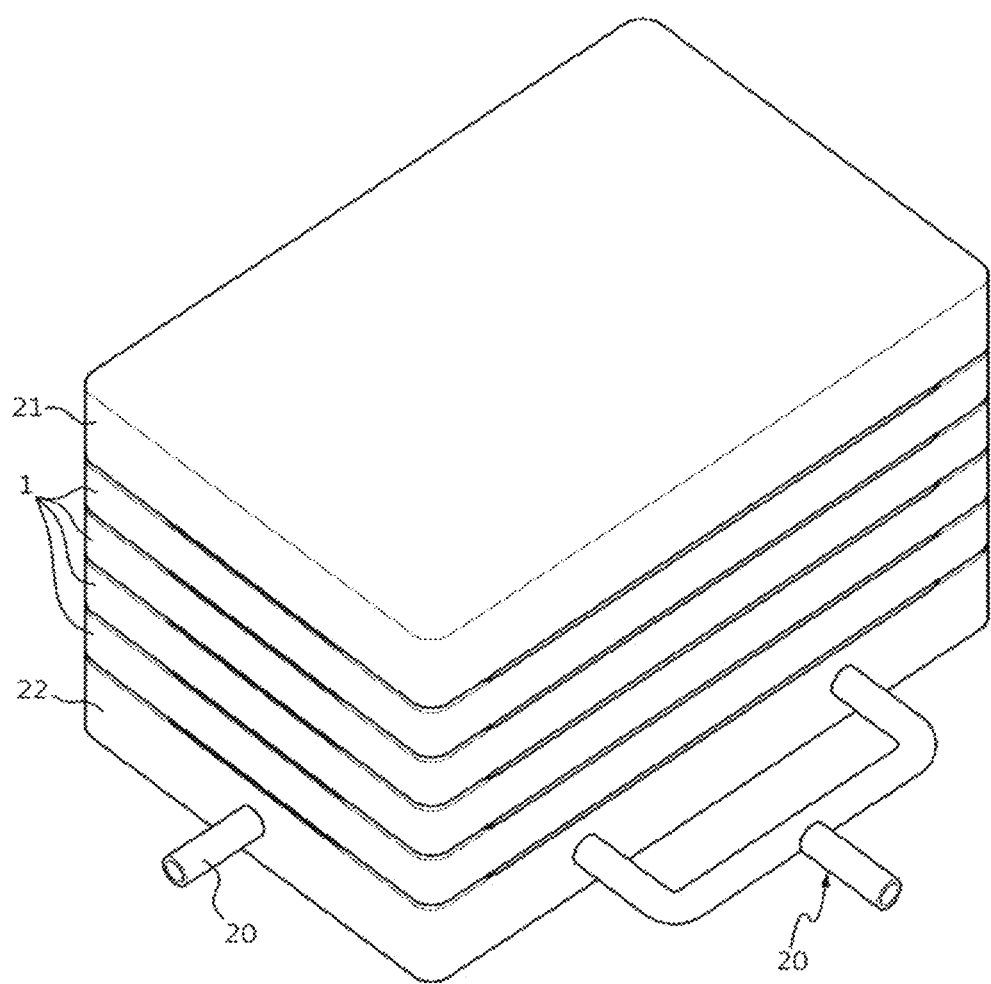
FIG. 9 is a perspective view of the solid-oxide fuel cell according to the present invention.

FIGS. 8 and 9 are views showing a solid-oxide fuel cell which is manufactured by layering current-collecting plates 21, 22 on the top and the bottom of the solid-oxide fuel cell stack. The current-collecting plate 22 layered on the bottom of the solid-oxide fuel cell stack is connected to a manifold 20 to allow fuel and air to be injected and discharged.

In this context, it is preferable that metal felts or ceramic felts are further provided between the layered unit cells to enhance power generation efficiency of the fuel cell.

INDUSTRIAL APPLICABILITY

According to the present invention, since the fuel flow holes and the air flow holes are vertically formed in the anode, there is no need for additional separating plates and additional sealing work for injection and discharge of fuel and air through a lateral surface of the fuel cell, and thus reduction in weight, size, manufacturing costs and the like of the unit cell for a solid-oxide fuel cell is achieved. Therefore, the industrial applicability of the present invention is ensured.

The invention claimed is:
1. A solid-oxide fuel cell comprising a plurality of unit cells, wherein:

each of the plurality of unit cells comprises an anode, an electrolyte layer, a cathode, a connector layer, and no separation plate, the anode comprises a first surface, a second surface, four edges with marginal regions along periphery of the four edges, fuel flow holes formed in a first set of marginal regions on two of the four edges which are opposite to each other, air flow holes formed in a second set of marginal regions on the other two edges of four edges, which are orthogonal to the two edges containing the fuel flow paths, the second set of marginal regions being opposite to each other, and a plurality of fuel flow paths formed in the anode;

the electrolyte layer is applied on the first surface of the anode;

the cathode is layered on the electrolyte layer;

the connector layer is applied on the second surface of the anode;

the plurality of unit cells are layered to provide a solid-oxide fuel cell stack such that a cathode of one of the unit cells is coupled to a connector layer of another unit cell, air flow holes of the plurality of unit cells are connected to each other to form an air flow passage, and fuel flow holes of a plurality of unit cells are connected to each other to form a fuel flow passage.

2. The solid-oxide fuel cell according to claim 1, wherein the plurality of unit cells are layered such that air and fuel are injected into and discharged from the air flow holes and the fuel flow holes of a lowermost unit cell of the plurality of layered unit cells.

3. The solid-oxide fuel cell according to claim 1, wherein a metal mesh or a ceramic felt is interposed between an anode of a unit cell and a connector layer of another unit cell.

4. The solid-oxide fuel cell according to claim 3, wherein the metal mesh includes at least one selected from the group consisting of gold, silver, platinum and stainless steel.

5. The solid-oxide fuel cell according to claim 1 further comprising a first current-collecting plate on the top of the solid-oxide fuel cell stack and a second current-collecting plate on bottom of the solid-oxide fuel cell stack, wherein the second current-collecting plate is connected to a manifold to allow fuel and air to be injected and discharged.

* * * * *